United States Patent
Chan et al.

(10) Patent No.: US 7,742,661 B2
(45) Date of Patent: Jun. 22, 2010

(54) DIGITAL IMAGE DATA PROCESSING APPARATUS

(75) Inventors: Kai-Cheng Chan, Taipei Hsien (TW); Chun-Chieh Chen, Taipei Hsien (TW)

(73) Assignee: Aten International Co., Ltd. (TW)

( * ) Notice: Subject to any disclaimer, the term of this patent is extended or adjusted under 35 U.S.C. 154(b) by 946 days.

(21) Appl. No.: 11/533,050

(22) Filed: Sep. 19, 2006

(65) Prior Publication Data

US 2007/0071358 A1     Mar. 29, 2007

(30) Foreign Application Priority Data

Sep. 27, 2005    (TW) ............................... 94133594 A

(51) Int. Cl.
*G06K 9/54*      (2006.01)
(52) U.S. Cl. ...................................... 382/305; 382/232
(58) Field of Classification Search ................. 382/232, 382/260, 209, 220, 263, 275, 305; 345/603, 345/530, 555, 502; 358/535, 1.1; 348/607, 348/625; 707/6, 104.1; 708/308; 715/700
See application file for complete search history.

(56) References Cited

U.S. PATENT DOCUMENTS

| | | | | |
|---|---|---|---|---|
| 5,448,372 A | * | 9/1995 | Axman et al. | 386/124 |
| 5,995,080 A | * | 11/1999 | Biro et al. | 345/603 |
| 7,123,768 B2 | * | 10/2006 | Mori | 382/181 |

FOREIGN PATENT DOCUMENTS

JP     06-325070     11/1994

OTHER PUBLICATIONS

English language translation of abstract of JP 06-325070—Nov. 1994.

\* cited by examiner

*Primary Examiner*—Anh Hong Do
(74) *Attorney, Agent, or Firm*—Chen Yoshimura LLP

(57) ABSTRACT

The present image processing apparatus includes a pixel arrangement controller and two data unit buffers coupled with the pixel arrangement controller. This controller can rearrange the addresses of the pixels in the corresponding data unit buffer according to the size of the block. Accordingly, the pixel data of the same block can be arranged in sequential addresses of the data unit buffer. Therefore, the pixel data may be processed as a batch.

20 Claims, 6 Drawing Sheets

201

| | 8 | | | | |
|---|---|---|---|---|---|
| 1 (address0) | 2 (address1) | 3 (address2) | ... | 8 (address7) | |
| 9 (address8) | 10 (address9) | 11(address10) | ... | 16 (address15) | |
| 17(address16) | 18(address17) | 19(address18) | ... | 24(address23) | block 1 |
| | | ... | | | |
| 57(address56) | 58(address57) | 59(address58) | ... | 64(address63) | |
| 65(address64) | 66(address65) | 67(address66) | ... | 72(address71) | |
| 73(address72) | 74(address73) | 75(address74) | ... | 80(address79) | block 2 |
| | | ... | | | |
| 121(address120) | 122(address121) | 123(address122) | ... | 128(address127) | |
| | | ... | | | |

1a, 1b indicate the first two rows; 2a, 2b indicate rows 9 and 10; 1024 at bottom.

| | 8 | | | | |
|---|---|---|---|---|---|
| 1 (address0) | 2 (address1) | 3 (address2) | ... | 8 (address7) | |
| 9 (address8) | 10 (address9) | 11 (address10) | ... | 16(address15) | |
| 17(address16) | 18(address17) | 19(address18) | ... | 24(address23) | block 129 |
| | | ... | | | |
| 57(address56) | 58(address57) | 59 (address58) | ... | 64(address63) | |
| 65(address64) | 66(address65) | 67 (address66) | ... | 72(address71) | |
| 73(address72) | 74(address73) | 75 (address74) | ... | 80(address79) | block 130 |
| | | ... | | | |
| 121(address120) | 122(address121) | 123(address122) | ... | 128(address127) | |
| | | ... | | | |

DIGITAL IMAGE DATA PROCESSING APPARATUS

RELATED APPLICATIONS

The present application is based on, and claims priority from, Taiwan Application Serial Number 94133594, filed Sep. 27, 2005, the disclosure of which is hereby incorporated by reference herein in its entirety.

FIELD OF THE INVENTION

The present invention is about an image processing apparatus, especially about an apparatus to arrange pixel data of an image.

BACKGROUND OF THE INVENTION

Image transporting is very important today. Image transporting requires a lot of computer resources. A lot of bandwidth is occupied when transporting large-sized image data over the Internet. Therefore, these image data are compressed before transporting. The typical compression technologies are JPEG technology and MPEG technology. In JPEG technology, the frame is separated into many blocks. Each block is 8×8 pixels. These blocks are sequentially stored in the memory. Then, a discrete cosine transform (DCT) is performed.

FIG. 1A illustrates a frame with M×N pixels that is separated into many blocks. Each block is 8×8 pixels. The block 1 includes the first pixel to the $(k \times k)_{th}$ pixel. The block 2 includes the $(k \times k+1)_{th}$ pixel to the $(k \times 2k)_{th}$ pixel. The rest may be deduced by analogy. When the frame with M×N pixels is stored in a memory, these pixels, the first pixel to the $(M \times N)_{th}$ pixel, are sequentially stored in the memory as shown in FIG. 1B. In other words, as shown is the FIG. 1B, the storing order is from the first pixel to the last pixel, $(k(N-k)+k)_{th}$ pixel, in the first row. After the pixels in the first row are stored, the pixels in the second row are started to store from the first pixel, $(k+1)_{th}$ pixel, to the last pixel in the second row. The rest may be deduced by analogy until all pixels are finished to store.

However, this kind of storage method may cause the pixels of the same block to be dispersed in a memory. FIG. 1C illustrates the storage status of these pixels in the memory. For example, the first row of pixels 1a, including the first pixel to the $k_{th}$ pixel, in the block 1 are arranged in the first row of the memory. However, the second row of pixels 1b, including the $(k+1)_{th}$ pixel to the $2k_{th}$ pixel, in the block 1 are arranged in the $(N/k+1)_{th}$ row of the memory. As a result, the pixels of the same block are not located in sequential addresses in the memory. Therefore, before a DCT calculation of each block is processed, the pixels of the same block are extracted from inconsecutive locations of the memory to recover a block with k×k, which may waste a lot of calculation time.

Therefore, a processing apparatus that may pre-arrange the pixels in a sequential address in a memory is required. Such processing apparatus may help the post processing apparatus to move a continuous and mass data to reduce the calculation time. For example, the K×K pixels may be moved together. Therefore, it is not necessary to individually move K pixels k times to group a K×K block.

SUMMARY OF THE INVENTION

The main purpose of the present invention is to provide an image processing apparatus to pre-arrange pixel data of an image in sequential addresses of a memory.

Another purpose of the present invention is to provide an image processing apparatus that can arrange pixel data of an image in advance.

A further purpose of the present invention is to provide a framework that can quickly process image data.

According to the present invention, the image processing apparatus includes a pixel arrangement controller and two data unit buffers coupled with the pixel arrangement controller. This controller can rearrange the address of each pixel in the corresponding data unit buffer according to the size of the block. Accordingly, the pixel data of the same block can be arranged in sequential addresses of the data unit buffer. Therefore, the pixel data can be batch-processed. The present invention also provides a method for rearranging pixel data. First, a frame of an image is divided into a plurality of blocks with K×K pixels. Then, a determination step is performed to decide whether or not a pixel data is received. When a pixel data is received, the horizontal address value of the pixel data is compared with the horizontal resolution value of an image. When the horizontal address value of the pixel data is equal to the horizontal resolution value of an image, the horizontal resolution value is subtracted from the horizontal address value and one is added into the vertical address value of the pixel data. Next, a determination step is performed to decide whether or not the added vertical address value is equal to the vertical row number (k) of a block. When the added vertical address value is not equal to the vertical row number of a block, the following program is performed to measure the address of a pixel data stored in a first memory:

Address=Base+(vertical address value×k)+Mod(horizontal address value, k)

wherein, Base=( horizontal address value/k)×k×k

On the other hand, when the added vertical address value is equal to the vertical row number of a block, the vertical address value is set to zero and the memory is switched to a second memory. Then, the foregoing program is performed again to measure the storage address. The pixel data is stored into the second memory based on the measured address.

The present invention also provides a pixel arrangement controller including a horizontal pixel counter (Hcount), a vertical pixel counter (Vcount), a divider, two multipliers and an adder. The divider coupled with the Hcount is used to divide the horizontal address by the size of the block to get a quotient and a remainder. The quotient sent to one of the multipliers is multiplied with the square of the size of the block to get a first result value. The other multiplier coupled with the Vcount is used to multiply the vertical address with the square of the size of the block to get a second result value. Finally, the adder is used to add the first result value, the second result value and the remainder to get an address.

BRIEF DESCRIPTION OF THE DRAWINGS

The foregoing aspects and many of the attendant advantages of this invention will become more readily appreciated and better understood by referencing the following detailed description, when taken in conjunction with the accompanying drawings, wherein:

FIGS. 5A and 5B illustrate schematic diagrams of the storage status of pixels in a memory that use the process apparatus of the present invention to store the pixels shown in FIG. 1A.

DETAILED DESCRIPTION OF THE PREFERRED EMBODIMENT

Figure 2:
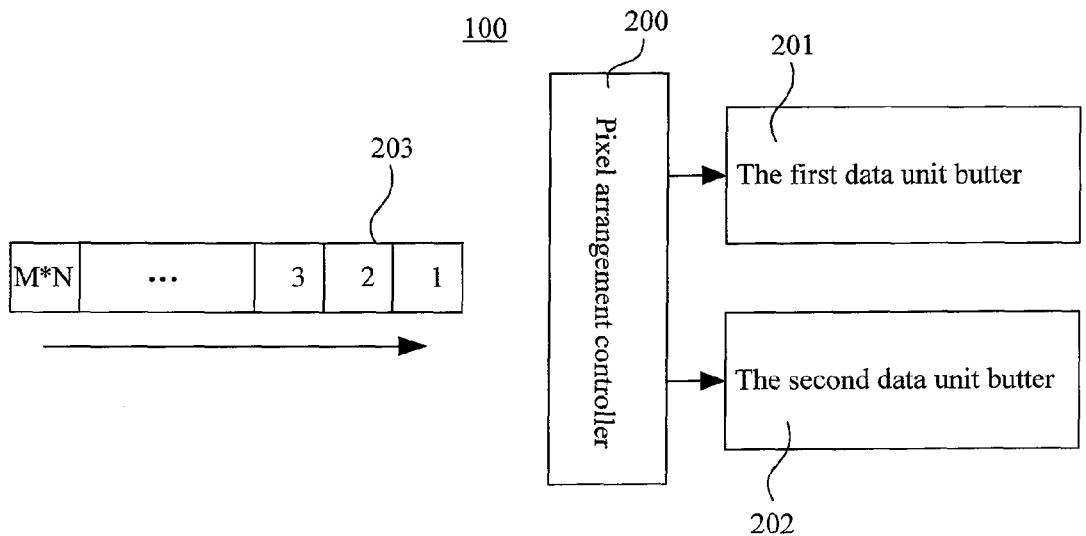
FIG. 2 illustrates a schematic diagram of a digital image data process apparatus of the present invention.

FIG. 2 illustrates a schematic diagram of an image processing apparatus according to the present invention. The image processing apparatus 100 includes a pixel arrangement controller 200 and two data unit buffers, including first unit buffer 201 and second buffer 202, coupled with the controller 200.

According to the preferred embodiment, the pixel arrangement controller 200 can rearrange the address of the data 203 in the corresponding data unit buffer according to the size of the block. Accordingly, the pixel data of the same block can be located in sequential addresses in the data unit buffer. Therefore, a direct memory access (DMA) apparatus can batch-process the pixels.

Moreover, the pixel data can be stored in two data unit buffers 201 and 202 respectively. In one embodiment, a frame is divided into many blocks. Each block is 8×8 pixels. These pixel data are stored in the data unit buffer 201 first. After the data of the pixels located in the first row to $K_{th}$ row of the frame have been stored in the unit buffer 201, the pixel arrangement controller 200 switches the first unit buffer 201 to the second unit buffer 202 to continue to store the data of the pixels located in the $(K+1)_{th}$ row to the $2K_{th}$ row of this frame. Therefore, the direct memory access (DMA) apparatus (not shown in this figure) can move the data in batches to the image processing apparatus or to another memory for storing. Moreover, by the design of two data unit buffers, the pixel arrangement controller 200 and the DMA can synchronize to process data, which improves the process data efficiency.

Figure 3:
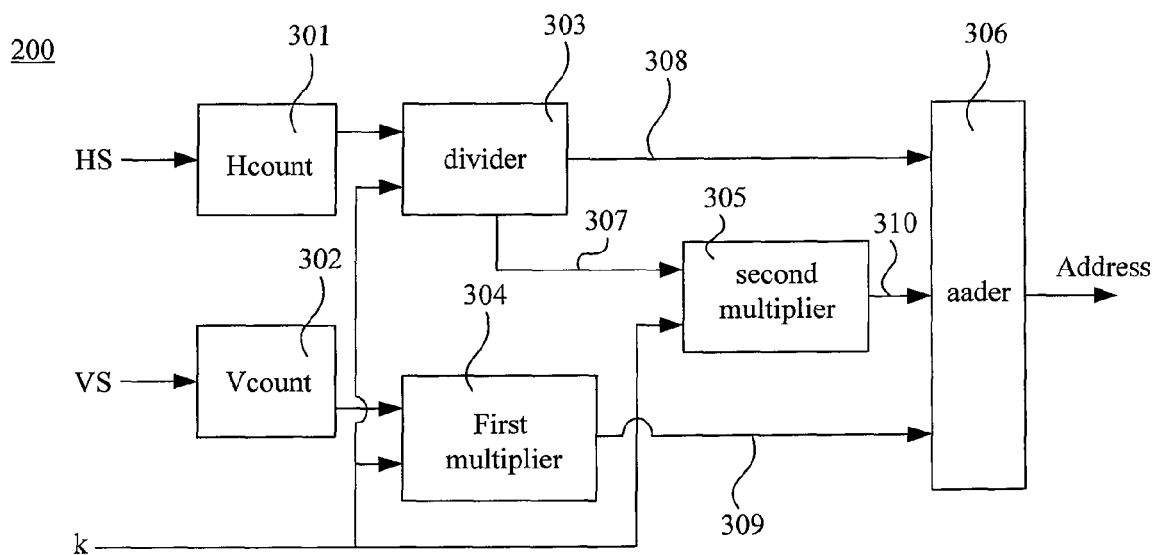
FIG. 3 is a detailed diagram of the pixel arrangement controller of the present invention.

FIG. 3 is a detailed diagram of the pixel arrangement controller of the present invention. The pixel arrangement controller 200 includes a horizontal pixel counter (Hcount) 301, a vertical pixel counter (Vcount) 302, a divider 303, first and second multipliers 304 and 305 and an adder 306. The Hcount 301 is used to receive the horizontal synchronization signal (HS). The Vcount 302 is used to receive the vertical synchronization signal (VS). The two synchronization signals, HS and VS, are used to calculate the horizontal number (HN) and the vertical number (VN) of a pixel data. The divider 303 coupled with the Hcount 301 is used to divide the HN calculated by the Hcount 301 with the size value of the block to get a quotient 307 and a remainder 308. In an embodiment, the size value is K for a K×K block. The quotient 307 is sent to the second multiplier 305. The remainder 308 is sent to the adder 306. The first multiplier 304 is connected to the Vcount 302 and the adder 306. The first multiplier 304 is used to multiply the VN calculated by the Vcount 302 by the size value, k, of the block to get a first result value 309. The first result value 309 is sent to the adder 306. The second multiplier 305 is connected to the divider 303 and receives the quotient 307.

The second multiplier 305 is used to multiply the quotient 307 with the square size value of the block to get a second result value 310. The square size value is $K^2$ for a K×K block. The second result value 310 is sent to the adder 306. The adder 306 adds the first result value 309, the second result value 310 and the remainder 308 to get a corresponding address of a pixel data located in the data unit buffer 201 or data unit buffer 202.

The following is a formula based on FIG. 3 and a K×K block.

Address=Base+(VN×K)+Mod(HN, K)

Base=INT(HN/K)×K×K

The Mod(HN, K) is the remainder 308 after HN is divided by K. The INT(HN/K) is the quotient 307 when HN is divided by K.

Figure 4:
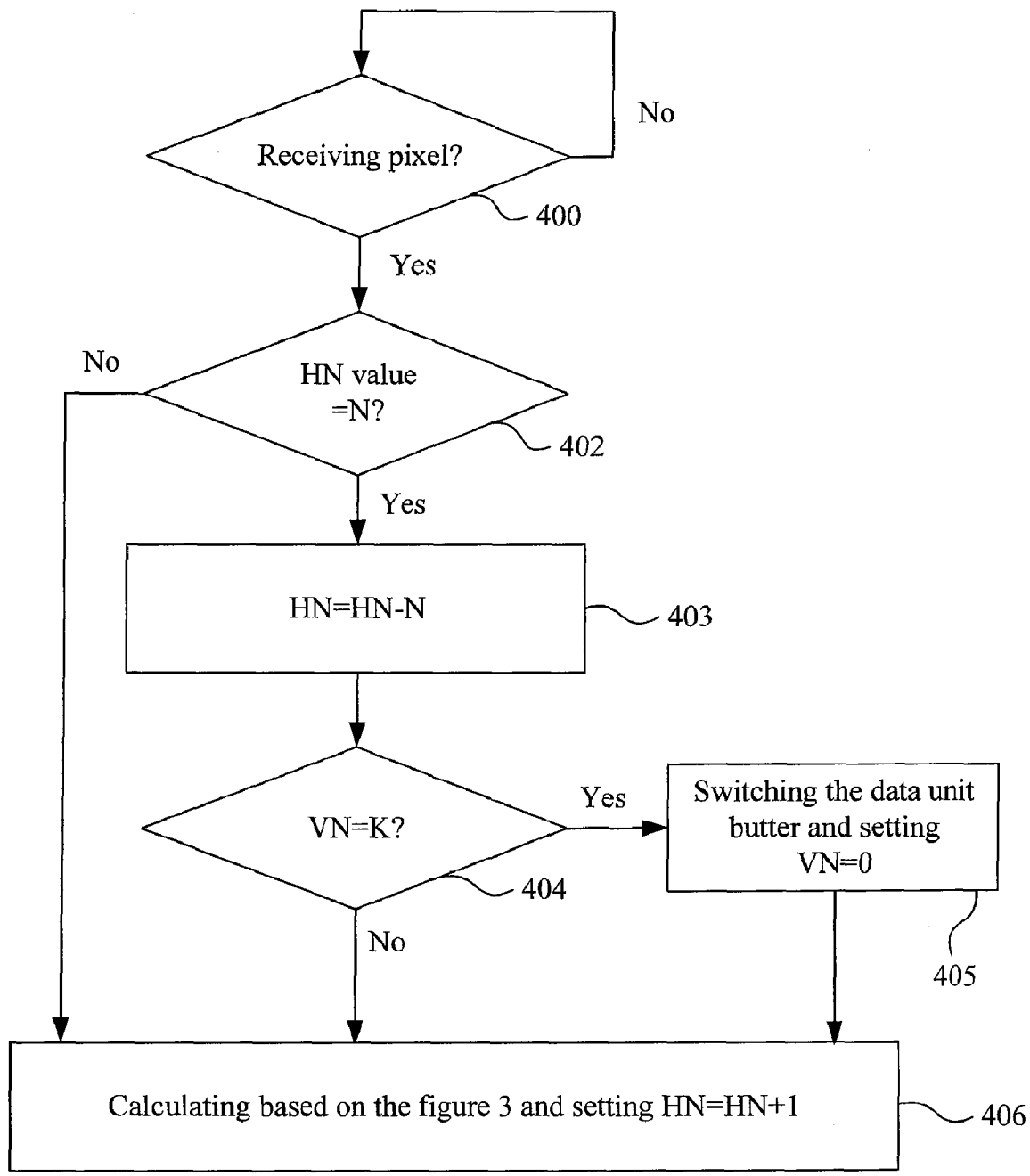
FIG. 4 is a flow chart to operate the pixel arrangement controller.

FIG. 4 is a flow chart of operating the pixel arrangement controller. Reference is also made to FIGS. 2, 3 and 4. In step 400, the pixel arrangement controller 200 determines whether or not a pixel data is received. The step 402 is performed when a pixel data is received. Otherwise, step 400 is repeatedly performed to determine whether or not a pixel data is received. In step 402, the pixel arrangement controller 200 determines whether or not the HN calculated by the Hcount 301 is equal to the horizontal resolution N. In an embodiment, the horizontal resolution is 1024 for a frame with a 1024×768 resolution. Therefore, in this step 402, HN is compared with 1024. When HN is equal to 1024, the step 403 is performed. When HN is not equal to 1024, the step 404 is performed.

In step 403, the HN is subtracted by N, the horizontal resolution. In step 404, the pixel arrangement controller 200 determines whether or not the VN calculated by the Vcount 302 is equal to the number of vertical rows of the block. In an embodiment, the number of vertical rows is 8 for a (8×8) block. Therefore, the VN is compared with 8. When the VN is not equal to 8, the step 406 is performed to calculate the address in the buffer, such as in the data unit buffer 201, based on FIG. 3 and add the HN by 1. When the VN is equal to 8, the step 405 is performed to switch the buffer and to set the VN from the Vcount 302 to zero. In an embodiment, the data unit buffer 201 is switched to the data unit buffer 202. After the buffer is switched, the step 406 is performed to calculate the address in the data unit buffer 202 based on FIG. 3 and to increment the HN by 1.

The following is an embodiment of data of pixels that are arranged in the data unit buffer 201 and data unit buffer buffer 202. In this embodiment, these data 203 are arranged in the data unit buffer 201 first. The resolution of this frame is 1024×768. Therefore, the N described in the foregoing is 1024. An 8×8 block is used to divide this frame. Therefore, the K is 8. Reference is made to FIGS. 2 to 4 and FIGS. 5A and 5B. In FIG. 2, the data 203 of the pixels is inputted to the pixel arrangement controller 200, wherein the 1, 2, . . . , M×N represent the data of the first pixel, the second pixel, . . . , the $(M×N)_{th}$ pixel in FIG. 1.

Figure 1A:
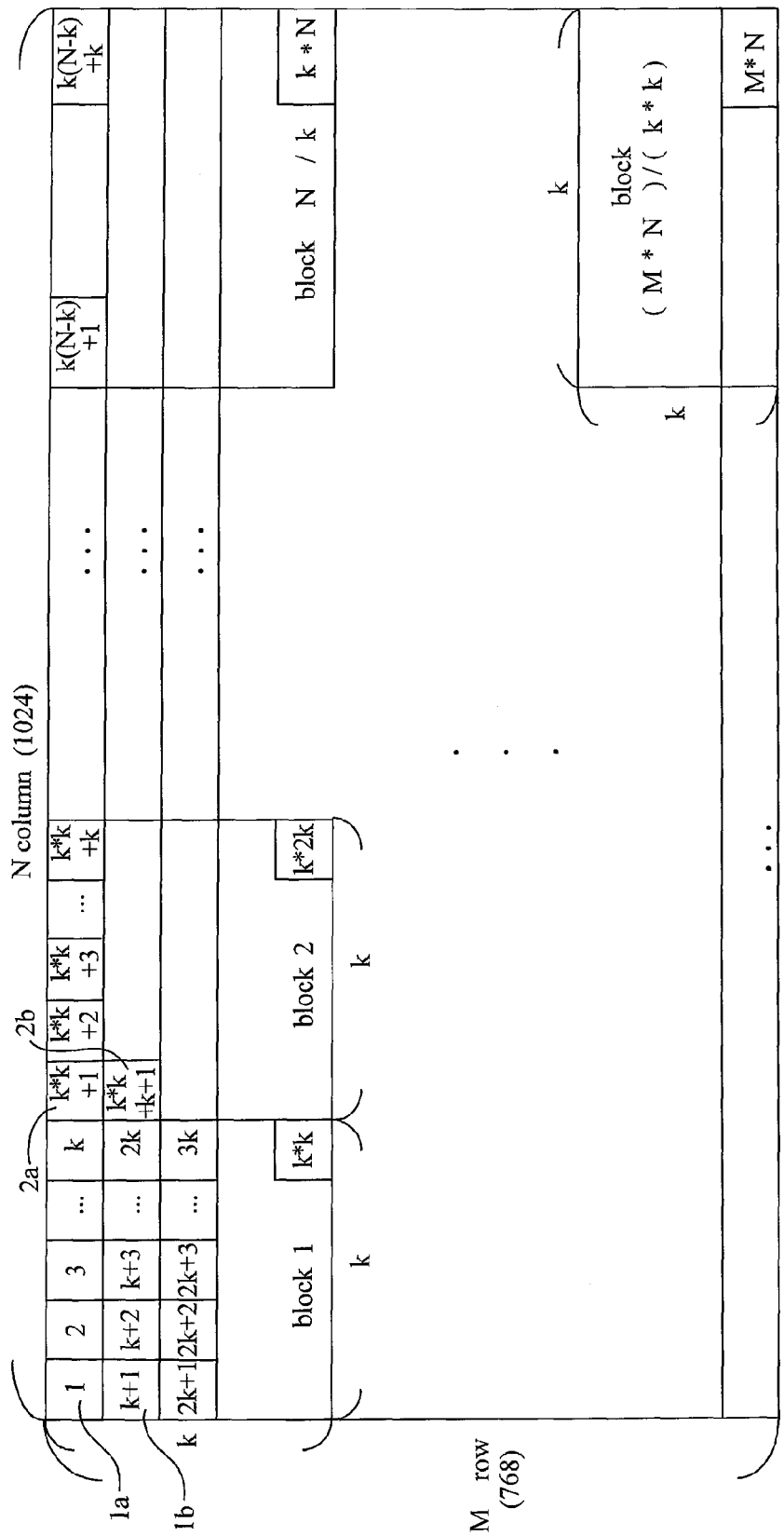
FIG. 1A illustrates a frame of M×N pixels that is separated into many blocks.
Figure 1B:
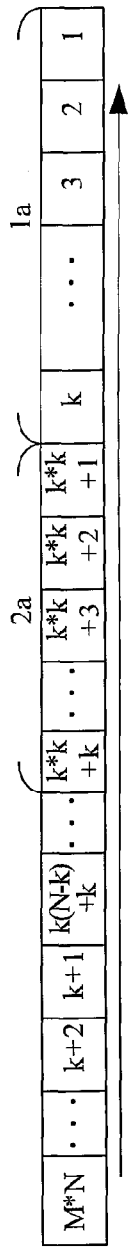
FIG. 1B illustrates pixels sequentially stored in the memory.
Figure 1C:
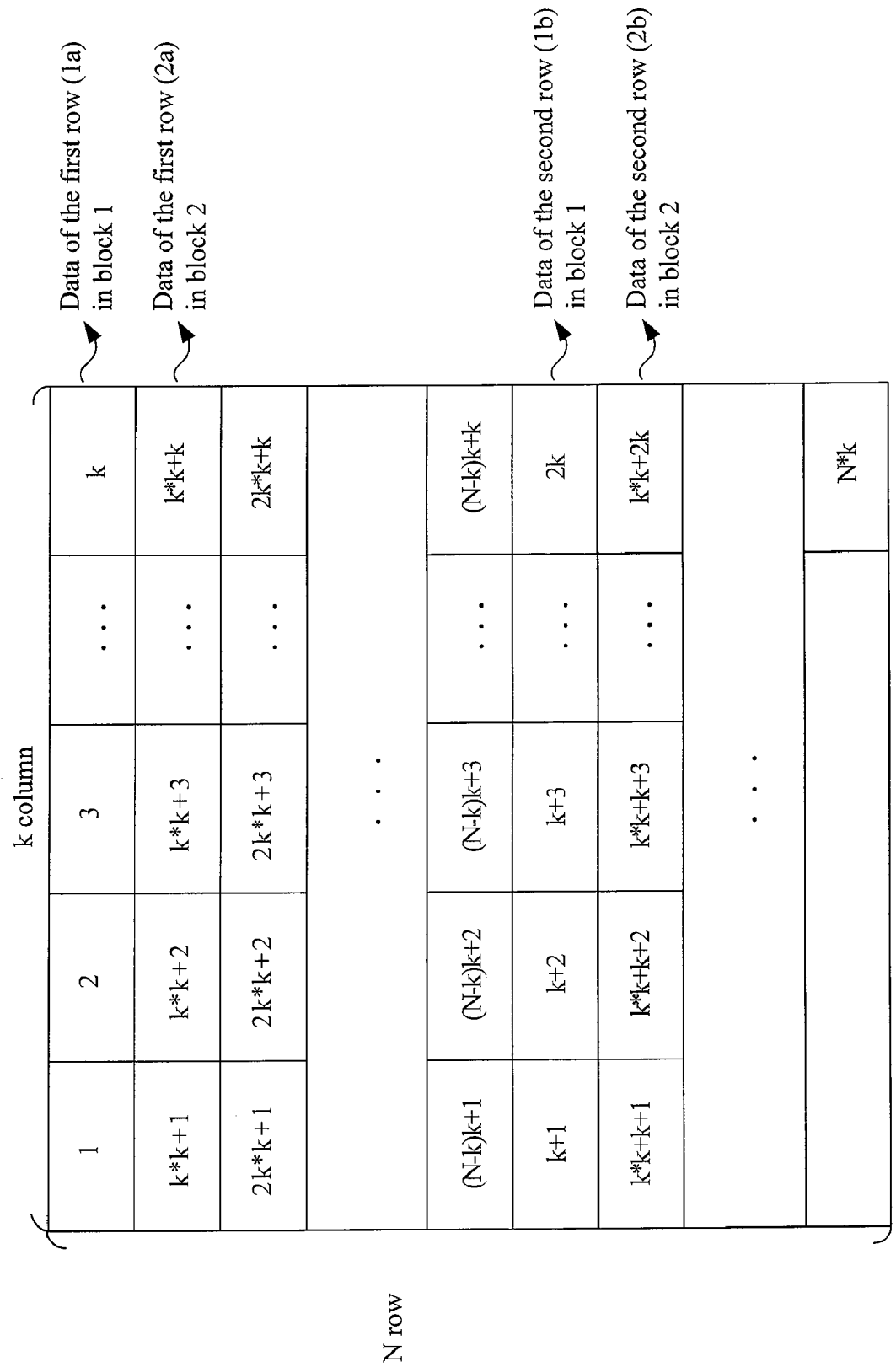
FIG. 1C illustrates the storage status of pixels in the memory.

According to the step 400, when the first pixel in FIG. 1 is transferred to the pixel arrangement controller 200, a receiving pixel determination is made. Then, the step 402 is performed. Based on the counting of the Hcount 301 and the Vcount 302, both the HN and the VN of the first pixel are zero. The HN is not equal to the horizontal resolution 1024. Therefore, it is not necessary to switch the unit data buffer 201 to unit data buffer 202. The first pixel is stored in the unit data buffer 201. Then, the step 406 is performed to calculate the address of the first pixel in the data unit buffer 201 is based on FIG. 3. According to FIG. 3, because both the HS and VS are zero, the result value calculated by the divider 303, the first multiplier 304 and the second multiplier 310 are zero. Therefore, the total value calculated by the adder 306 is zero. In other words, the data of the first pixel is stored in the address 0, location 1 shown in FIG. 5A, of the unit data buffer 201.

According to the step 400, when the second pixel in FIG. 1A is transferred to the pixel arrangement controller 200, a receiving pixel determination is made. Then, the step 402 is performed. Based on the counting of the Hcount 301 and the Vcount 302, the HN is 1 and the VN is zero. The HN is not equal to the horizontal resolution 1024. Therefore, it is not necessary to switch the unit data buffer 201 to unit data buffer 202. The second pixel is still stored in the unit data buffer 201. Then, the step 406 is performed to calculate the address of the second pixel in the data unit buffer 201 based on FIG. 3. According to FIG. 3, because the HN is 1, the quotient 307 and the remainder 308 that are calculated by divider 303 to divide the HN with K are zero and 1 respectively. The quotient 307 is sent to the second multiplier 305 to multiply with $K^2$. Because the quotient 307 is zero, the second result value 310 is zero. On the other hand, the VN is zero and is sent to the first multiplier 304 to multiply with K to get the first result value 309. Therefore, the first result value 309 is zero. The total value of the first result value 309, the second result value 310 and the remainder 308 calculated by the adder 306 is 1. In other words, the data of the second pixel is stored in the address 1, location 2 shown in FIG. 5A, of the unit data buffer 201.

When the eighth pixel in FIG. 1A is transferred to the pixel arrangement controller 200, according to the step 400, a receiving pixel determination is made. Then, the step 402 is performed. Based on the counting of the Hcount 301 and the Vcount 302, the HN is 7 and the VN is 0. The HN is not equal to the horizontal resolution 1024. Therefore, it is not necessary to switch the unit data buffer 201 to unit data buffer 202. The eighth pixel is still stored in the unit data buffer 201. Then, the step 406 is performed to calculate the address of the eighth pixel in the data unit buffer 201 based on FIG. 3. According to FIG. 3, because the HN is 7, the quotient 307 and the remainder 308 that are calculated by divider 303 to divide the HN with K are zero and 7 respectively. The quotient 307 is sent to the second multiplier 305 to multiply with $K^2$. Because the quotient 307 is zero, the second result value 310 is zero. On the other hand, the VN is zero and is sent to the first multiplier 304 to multiply with K to get the first result value 309. Therefore, the first result value 309 is zero. The total value of the first result value 309, the second result value 310 and the remainder 308 calculated by the adder 306 is 7. In other words, the data of the eighth pixel is stored in the address 7, location 8 shown in FIG. 5A, of the unit data buffer 201.

When the ninth pixel in FIG. 1A is transferred to the pixel arrangement controller 200, according to the step 400, a receiving pixel determination is made. Then, the step 402 is performed. Based on the counting of the Hcount 301 and the Vcount 302, the HN is 8 and the VN is 0. The HN is not equal to the horizontal resolution 1024. Therefore, it is not necessary to switch the unit data buffer 201 to unit data buffer 202. The ninth pixel is still stored in the unit data buffer 201. Then, the step 406 is performed to calculate the address of the ninth pixel in the data unit buffer 201 based on FIG. 3. According to FIG. 3, because the HN is 8, the quotient 307 and the remainder 308 that are calculated by divider 303 to divide the HN with K are 1 and 0 respectively. The quotient 307 is sent to the second multiplier 305 to multiply with $K^2$. Because the quotient 307 is 1 and the K is 8, the second result value 310 is 64. On the other hand, the VN is zero and is sent to the first multiplier 304 to multiply with K to get the first result value 309. Therefore, the first result value 309 is zero. The total value of the first result value 309, the second result value 310 and the remainder 308 calculated by the adder 306 is 64 . In other words, the data of the ninth pixel is stored in the address 64, location 65 shown in FIG. 5A, of the unit data buffer 201. The rest may be deduced by analogy.

Therefore, according to the present invention, the ninth pixel is arranged in the address 64 in the data unit buffer 201. In other words, the location of the ninth pixel is not arranged after the location of the eighth pixel. The location of the ninth pixel is arranged after these locations of the pixels of block 1 in the data unit buffer 201. Therefore, pixels of the same block are arranged in sequential addresses according to the present invention.

When the $(1025)_{th}$ pixel in FIG. 1A is transferred to the pixel arrangement controller 200, according to the step 400, a receiving pixel determination is made. Then, the step 402 is performed. Based on the counting of the Hcount 301 and the Vcount 302, the HN is 1024 and the VN is 1. The HN is equal to the horizontal resolution 1024. In the step 403, the HN is set to substrate 1024. The HN is zero and the VN is 1. The VN is not equal to the K. Therefore, it is not necessary to switch the unit data buffer 201 to unit data buffer 202. The $(1025)_{th}$ pixel is still stored in the unit data buffer 201. Then, the step 406 is performed to calculate the address of the $(1025)_{th}$ pixel in the data unit buffer 201 based on FIG. 3. According to FIG. 3, because the HN is 0, the quotient 307 and the remainder 308 that are calculated by divider 303 to divide the HN with K are both 0. The quotient 307 is sent to the second multiplier 305 to multiply with $K^2$. Because the quotient 307 is 0 and the K is 8, the second result value 310 is 0. The VN is 1 and is sent to the first multiplier 304 to multiply with K to get the first result value 309. Therefore, the first result value 309 is 8. The total value of the first result value 309, the second result value 310 and the remainder 308 calculated by the adder 306 is 8. In other words, the data of the $(1025)_{th}$ pixel is stored in the address 8, location 7 shown in FIG. 5A, of the unit data buffer 201. Therefore, the location of the $(1025)_{th}$ pixel follows the location of the eighth pixel.

When the $(8193)_{th}$ pixel, located in the first location of the ninth row, in FIG. 1A is transferred to the pixel arrangement controller 200, according to the step 400, a receiving pixel determination is made. Then, the step 402 is performed. Based on the counting of the Hcount 301 and the Vcount 302, the HN is 1024 and the VN is 7. The HN is equal to the horizontal resolution 1024. Therefore, the step 403 is performed. In the step 403, the HN is set to substrate 1024. Therefore, the HN is zero. The VN is set to add 1. Therefore, the VN is 8 that is equal to the K. In step 404, VN equal to 8 is determined. Therefore, the step 405 is performed. In step 405, the unit data buffer 201 is switched to the unit data buffer 202. The VN is set to zero. Therefore, the $(8193)_{th}$ pixel is stored in the unit data buffer 202. Then, the step 406 is performed to calculate the address of the $(8193)_{th}$ pixel in the data unit buffer 201 based on FIG. 3. According to FIG. 3, because the HN is 0, the quotient 307 and the remainder 308 that are calculated by divider 303 to divide the HN with K are both 0. The quotient 307 is sent to the second multiplier 305 to multiply with $K^2$. Because the quotient 307 is 0 and the K is 8, the second result value 310 is 0. On the other hand, the VN is 0 and is sent to the first multiplier 304 to multiply with K to get the first result value 309. Therefore, the first result value 309 is 0. The total value of the first result value 309, the second result value 310 and the remainder 308 calculated by the adder 306 is 0. In other words, the data of the $(8193)_{th}$ pixel is stored in the address 0, location 1 shown in the FIG. 5B, of the second unit data buffer 202.

The rest may be deduced by analogy. When the $(8201)_{th}$ pixel, located in the ninth location of the ninth row, in FIG. 1A is transferred to the pixel arrangement controller 200, according to the step 400, a receiving pixel determination is made. Then, the step 402 is performed. Based on the counting of the Hcount 301 and the Vcount 302, the HN is 8 and the VN is 0. The HN is not equal to the horizontal resolution 1024. Therefore, the unit data buffer 202 is not switched. The VN is set to zero. Therefore, the $(8201)_{th}$ pixel is stored in the unit data buffer 202. Then, the step 406 is performed to calculate the address of the $(8201)_{th}$ pixel in the data unit buffer 201 based on FIG. 3. According to FIG. 3, because the HN is 8, the quotient 307 and the remainder 308 that are calculated by divider 303 to divide the HN with K are 1 and 0 respectively. The quotient 307 is sent to the second multiplier 305 to multiply with $K^2$. Because the quotient 307 is 1 and the K is 8, the second result value 310 is 64. On the other hand, the VN is 0 and is sent to the first multiplier 304 to multiply with K to get the first result value 309. Therefore, the first result value 309 is 0. The total value of the first result value 309, the second result value 310 and the remainder 308 calculated by the adder 306 is 64. In other words, the data of the $(8201)_{th}$ pixel is stored in the address 64, location 65 shown in FIG. 5B, of the second unit data buffer 202.

Therefore, according to the present invention, the $(8201)_{th}$ pixel is arranged in the address 64 in the data unit buffer 202. In other words, the I location of the $(8201)_{th}$ pixel is arranged after these locations of the pixels of block 129 in the data unit buffer 202. Therefore, pixels of same block are arranged in sequential address according to the present invention.

Accordingly, after the data of the pixels located in the first row to the eighth row are stored in the first data unit buffer 201, the pixel arrangement controller 200 switches the first data unit buffer 201 to the second data unit buffer 202 to store the data of the pixels located in the ninth row to the sixtieth row. In other words, the pixel arrangement controller 200 includes two functions. One is to rearrange the data location of the pixels and the other is to switch the data unit buffers 201 and 202.

Figure 6A:
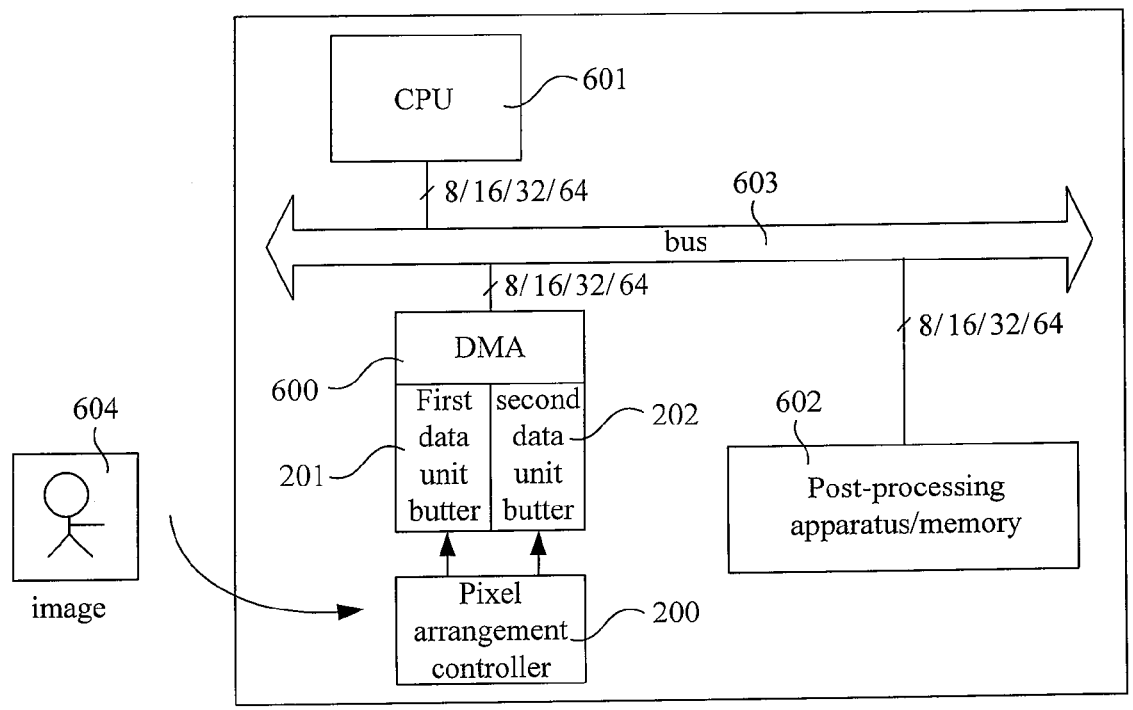
FIG. 6A illustrates a schematic diagram of installing the digital image processing apparatus in a system according to an embodiment.

FIG. 6A illustrates a schematic diagram of installing the digital image processing apparatus in a system according to an embodiment. The system includes a CPU 601, a post-process apparatus/memory 602, a direct memory access (DMA) apparatus 600, a pixel arrangement controller 200, a first data unit buffer 201 and a second data unit buffer 202 that are together connected to a bus 603. When an image 604 is transferred to the pixel arrangement controller 200, the pixel arrangement controller 200 can switch the first data unit buffer 201 and the second data unit buffer 202 based on the resolution of the image 604 and the K value of the (K×K) block that is used to divide the image 604. Moreover, a new address is calculated by the pixel arrangement controller 200 to rearrange the pixels in the first data unit buffer 201 or the second data unit buffer 202. According to the present invention, the pixels of the same block can be arranged in a sequential addresses. Therefore, the DMA 600 can move the data in batches. That is, the data of a same block can be accessed together. The data can be transferred to the post-process apparatus 602 to store or to process for the CPU 601. The two data unit buffers can be accessed by the pixel arrangement controller and the DMA respectively, which can improve the access efficiency.

Figure 6B:
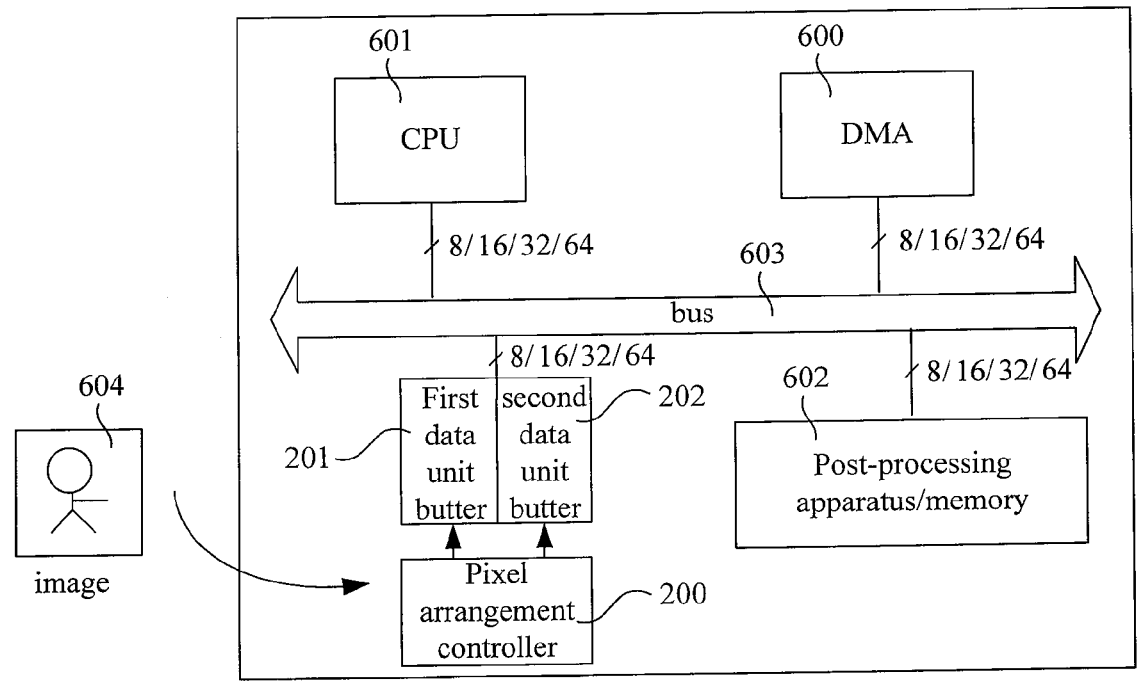
FIG. 6B illustrates a schematic diagram of installing the digital image processing apparatus in a system according to another embodiment.

It is noticed that the DMA 600, the pixel arrangement controller 200, the first data unit buffer 201 and the second data unit buffer 202 may be integrated together as shown in FIG. 6A. In other embodiments, as shown in FIG. 6B, the DMA 600 is an apparatus that is coupled to the bus 603. Moreover, the first data unit buffer 201 and the second data unit buffer 202 may be separated physically; or, the first data unit buffer 201 and the second data unit buffer 202 may be different parts in a memory.

Accordingly, the digital image processing apparatus of the present invention can arrange the pixels of a same block that is used to divide an image data into sequential addresses of a memory based on the size of the block. Therefore, the DMA can move the data in batches. That is, the data of a same block can be accessed together to transfer to a post-process apparatus for processing or to a memory for storage. Moreover, there are two data unit buffers in the present invention. Therefore, the two data unit buffers are accessed by the pixel arrangement controller and the DMA respectively, which can improve the access efficiency.

As is understood by a person skilled in the art, the foregoing descriptions of the preferred embodiment of the present invention are an illustration of the present invention rather than a limitation thereof. Various modifications and similar arrangements are included within the spirit and scope of the appended claims. The scope of the claims should be accorded to the broadest interpretation so as to encompass all such modifications and similar structures.

What is claimed is:

1. An image processing apparatus for arranging an image with M.times.N pixels, wherein said image is divided into a plurality of (K.times.K) blocks, said apparatus comprising:
   a memory; and
   an arrangement controller coupled with said memory to determine addresses of said pixels in said memory, wherein pixels of the same (K.times.K) block are arranged in sequential addresses in said memory.

2. The apparatus of claim 1, further comprising a direct memory access coupled with said memory to access the data of said pixels in said memory.

3. The apparatus of claim 1, further comprising:
   an additional memory; and
   said arrangement controller also coupled with said additional memory to determine addresses of said pixels in said memory or said additional memory, wherein pixels of the same (K.times.K) block are arranged in sequential addresses in said memory or said additional memory.

4. The apparatus of claim 3, further comprising a direct memory access coupled with said memory and said additional memory to access the data of said pixels in said memory and said additional memory.

5. The apparatus of claim 3, wherein said arrangement controller further comprises:
   a horizontal counter to count a horizontal number;
   a vertical counter to count a vertical number;
   a divider coupled with said horizontal counter to divide said horizontal number with K to generate a quotient and a remainder;
   a first multiplier coupled with said vertical counter to multiply said vertical number with K to generate a first result value;
   a second multiplier coupled with said divider to multiply said quotient with K.sup.2 to generate a second result value; and
   an adder coupled with said divider, said first multiplier and said second multiplier to add said remainder, said first result value and said second result value to generate a value of an address.

6. The apparatus of claim 5, wherein said address is equal to the following equation:

Address =INT(horizontal number/$K$).times.$K$.times.$K$ +(vertical number.times.$K$) +Mod(horizontal number, $K$)

wherein the INT(horizontal number/K) means a quotient of said horizontal number divided by the K, and the Mod(horizontal number, K) means a remainder of said horizontal number divided by the K.

7. The apparatus of claim 5, wherein said vertical counter resets said vertical number when said vertical number is equal to K.

8. The apparatus of claim 5, wherein said arrangement controller switches said memory and said additional memory when said vertical number is equal to K.

9. The apparatus of claim 5, wherein said horizontal counter subtracts N from said horizontal number when said horizontal number is equal to N.

10. The apparatus of claim 5, wherein said arrangement controller switches said memory and said additional memory when pixels of each K row are stored.

11. An image processing apparatus for arranging an image with M.times.N pixels, wherein said image is divided into a plurality of (K.times.K) blocks, said apparatus comprising:
a first memory and a second memory;
an arrangement controller coupled with said first memory and said second memory to determine addresses of said pixels in said first memory or said second memory, wherein said pixels are grouped by each K rows, and pixels of each group are arranged in sequential addresses in said first memory or said second memory;
wherein said arrangement controller further comprises:
a horizontal counter to count a horizontal number;
a vertical counter to count a vertical number;
a divider coupled with said horizontal counter to divide said horizontal number with K to generate a quotient and a remainder;
a first multiplier coupled with said vertical counter to multiply said vertical number with K to generate a first result value;
a second multiplier coupled with said divider to multiply said quotient with $K^2$ to generate a second result value; and
an adder coupled with said divider, said first multiplier and said second multiplier to add said remainder, said first result value and said second result value to generate a value of an address.

12. The apparatus of claim 11, further comprising a direct memory access coupled with said first memory and said second memory to access the data of said pixels in said first memory and said second memory.

13. The apparatus of claim 11, wherein said address is equal to the following equation:

Address =$INT$(horizontal number/$K$).times.$K$.times.$K$+ (vertical number.times.$K$) +Mod(horizontal number, $K$)

wherein the INT(horizontal number/K) means a quotient of said horizontal number divided by the K, and the Mod(horizontal number, K) means a remainder of said horizontal number divided by the K.

14. The apparatus of claim 11, wherein said vertical counter resets said vertical number when said vertical number is equal to K.

15. The apparatus of claim 11, wherein said arrangement controller switches said first memory and said second memory when said vertical number is equal to K.

16. The apparatus of claim 11, wherein said horizontal counter subtracts N from said horizontal number when said horizontal number is equal to N.

17. The apparatus of claim 11, wherein said arrangement controller switches said first memory and said second memory when pixels of each K row are stored.

18. An image processing method implemented in an image processing apparatus for arranging the pixels of an image with M.times.N pixels, wherein said image is divided into a plurality of (K.times.K) blocks, said method comprising:
(a) receiving a pixel;
(b) determining whether or not a horizontal number of said pixel is equal to N, and performing step (c) and then step (d) when said horizontal number of said pixel is equal to N, and performing step (d) when said horizontal number of said pixel is not equal to N;
(c) subtracting N from said horizontal number;
(d) determining whether or not a vertical number of said pixel is equal to K, and performing step (e) and then step (f) when said vertical number of said pixel is equal to K, and performing step (f) when said vertical number of said pixel is not equal to K;
(e) switching between a first memory and a second memory of said image processing apparatus, and setting said vertical number to zero;
(f) calculating an address of said pixel using the following equation:

Address=$INT$(horizontal number/$K$).times.$K$.times.$K$+ (vertical number.times.$K$) +Mod(horizontal number, $K$)

wherein the INT(horizontal number/K) means a quotient of said horizontal number divided by the K, and the Mod(horizontal number, K) means a remainder of said horizontal number divided by the K; and
(g) arranging said pixel in said first memory or in said second memory based on said address.

19. The method of claim 18, further comprising accessing pixels stored in said first memory and said second memory for processing.

20. The method of claim 18, wherein calculating an address of said pixel comprises:
counting a horizontal number;
counting a vertical number;
dividing said horizontal number with K to generate a quotient and a remainder;
multiplying said vertical number with K to generate a first result value;
multiplying said quotient with $K^2$ to generate a second result value; and
adding said remainder, said first result value and said second result value to generate a value of an address.

* * * * *